March 14, 1967 F. W. ABRAMSON 3,308,780
HYDROSKI VEHICLE

Filed Aug. 3, 1965

INVENTOR.
FRANZ W. ABRAMSON
BY
*George C. Sullivan*
Agent

March 14, 1967     F. W. ABRAMSON     3,308,780
HYDROSKI VEHICLE
Filed Aug. 3, 1965     2 Sheets-Sheet 2
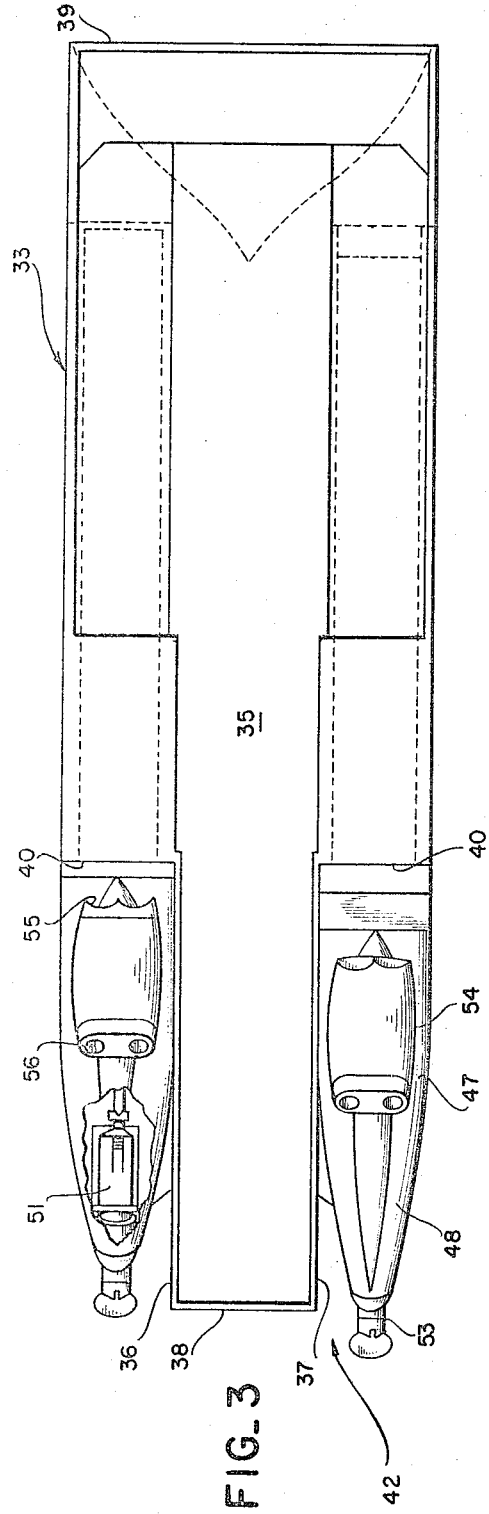
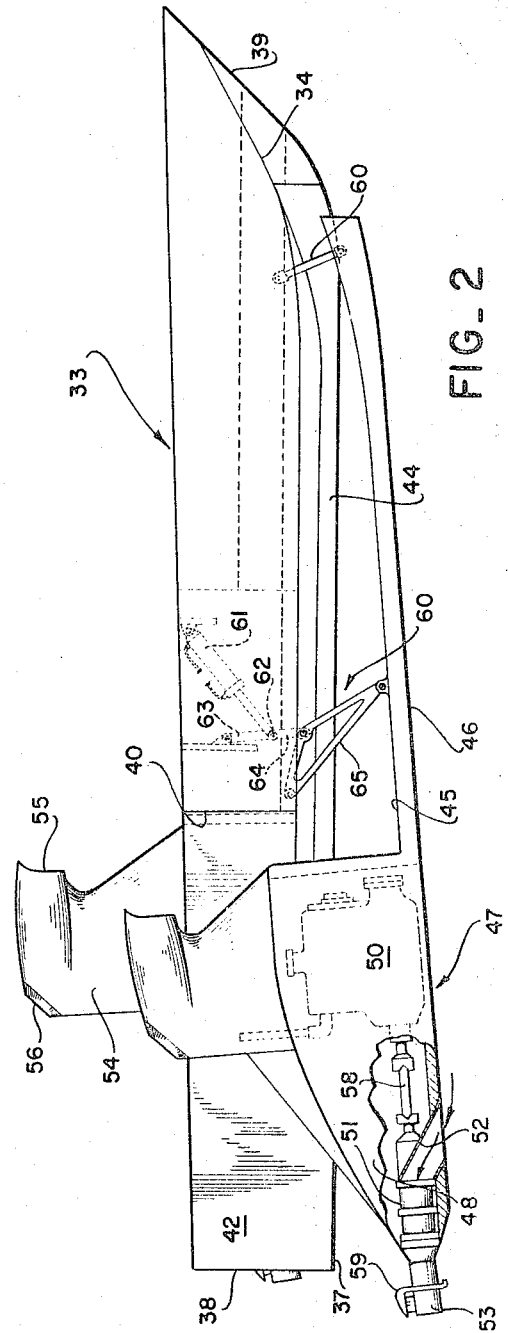
INVENTOR.
FRANZ W. ABRAMSON
BY
George Sullivan
Agent

United States Patent Office 3,308,780
Patented Mar. 14, 1967

3,308,780
HYDROSKI VEHICLE
Franz W. Abramson, La Canada, Calif., assignor to Lockheed Aircraft Corporation, Burbank, Calif.
Filed Aug. 3, 1965, Ser. No. 476,801
14 Claims. (Cl. 114—66.5)

The present invention relates to marine vehicles having retractable hydroskis and more particularly to an improved hydroski vehicle having optimized planing areas for specific speed ranges and having its primary power plants mounted on the hydroskis for propelling the vehicle in various planing modes of operation.

Hydroski vehicles are designed and constructed to operate in various planing modes such as a low speed mode wherein the vehicle is supported in the water by its basic hull, a high speed mode wherein the vehicle is supported on the water by a pair of retractable skis, and a transition mode wherein the vehicle may be supported in various degrees by both the basic hull and the hydroskis.

It is customary to provide a primary power plant for propelling the vehicle in these modes of operation. The power plant is mounted in the basic hull for operating a propelling unit which is either carried on the skis per se or which is carried on the basic hull and selectively submerged in the water during the low speed mode of operation while having a separate power plant and propelling unit for the high speed mode of operation. The primary power plant is coupled to the propelling unit by means of a drive shaft of relatively long length so that the propelling unit may be kept in the water during the transition and high speed modes. This is especially true in the high speed mode since the basic hull is removed from the water and the power plant is therefore located further away from the propelling unit than during low speed operation.

The employment of such relatively long drive shafts usually introduces many problems by generating undesirable torque and vibration. Also, primary power plants which are mounted on the basic hull are usually located in the stern of the vehicle, thereby necessitating the use of a V drive power transmission unit to mate the power plant to the respective rearward facing propellers when a plurality of propellers are employed. Such transmission units amplify torque and vibration characteristics and result in power loss and design complexity.

Conventional planing vehicles have little difficulty in attaining high speed operation in smooth water. However, when waves are encountered the vertical accelerations and wave impacts experienced necessitate a drastic reduction. For example, the passenger in a conventional planing hydroski vehicle operating in heavy seas experiences such a rough ride that the operator must resort to the low speed or a displacement mode of operation. During such operation variations in the water surface cause lift fluctuations which result, in turn, in changes in the amount of wetted bottom area of the vehicle. Hence, this extent of the wetted bottom area bears a direct relation to planing lift and operating efficiency of the vehicle throughout its various modes of operation.

The hydroski vehicle of the present invention avoids the problems and difficulties encountered with conventional planing or hydroski vehicles by incorporating retractable skis on a planing hull. The resulting composite structure has a reduced wetted area and an increased percentage of load alleviation as compared with conventional vehicles. This composite structure has two distinguishable planing areas, one area being the hydroskis per se and the other comprising hydroskis in combination with the planing hull. Each such area is optimized for a specific speed range, for example, as represented by either the low speed or the high speed mode of operation.

An important feature of this invention resides in the fact that the primary power plant for vehicle propulsion is mounted on the individual or each of a plurality of skis rather than on the basic hull, thereby permitting the use of a relatively short drive shaft between the power plant and the propulsion unit. The mounting of the primary power means on the hydroskis with the exit nozzle directed slightly downward also assures a downward thrust component from the propelling unit so that improved conditions of maneuverability and stability are achieved during planing and so that the prior art problem of keeping a propulsion unit in the water during transition from low speed to high speed operation is overcome.

Therefore, it is a primary object of the present invention to provide a novel marine vehicle incorporating at least one extendable hydroski which provides hydrodynamic lift at high cruising speeds, the remainder of the vehicle hull being above the water.

Still another object of the invention is to provide a novel hydroski vehicle wherein the basic hull provides vehicle support for static displacement and low speed mode and a portion of the planing surface during the transition mode.

Another object of invention is to provide a novel hydroski marine vehicle employing narrow-beam skis, substantially reducing the wetted area during high speed planing and the flat hull plate area exposed to wave impact.

Still another object of the present invention is to provide a hydroski vehicle having a wetted area which is less sensitive to wave slamming forces than are those of conventional vehicles, thereby avoiding significant changes in wetted area and permitting the maintenance of high speed in a seaway.

A still further object of invention is to provide a novel hydroski vessel wherein the hydroskis are readily retractable to control or change the vessel wetted area and whereby load alleviation is greatly increased over a conventional planing hull by controlling the vessel wetted area.

A further object is the provision of an improved hydroski vehicle wherein torque and vibration problems are materially reduced by a hydroski-mounted propulsion system.

The features of the present invention which are believed to be novel are set forth with particularity in the appended claims. The present invention, both as to its organization and manner of operation, together with further objects and advantages thereof, may be best understood by reference to the following description taken in connection with the accompanying drawings, in which:

FIGURE 2 is a side elevational view of a marine vehicle of somewhat different configuration and having power plants mounted on hydroskis, a portion of the structure being broken away to show the power plant drive shaft and hydrojet propulsion pump;

FIGURE 3 is a plan view of the vehicle shown in FIGURE 2;

Figure 1:
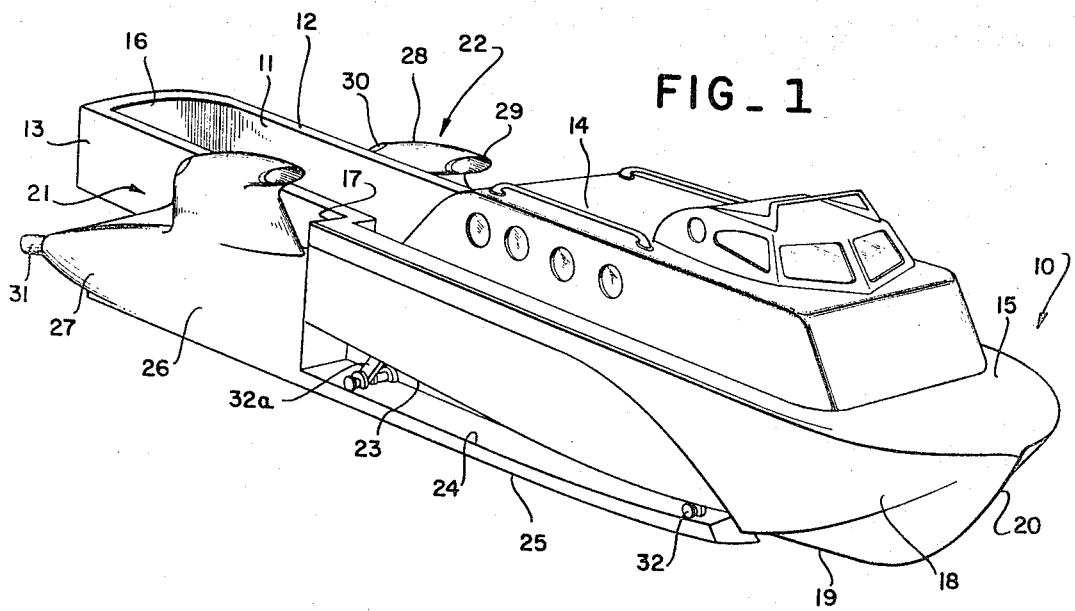
FIGURE 1 is a perspective view of a marine vehicle having the power plant mounted on retractable hydroskis in accordance with the present invention.

Referring now to the drawings, there is shown in FIGURE 1 a marine vehicle embodying the present invention. The embodiment selected for illustration is a marine vehicle capable of performing operations as a patrol craft. The numeral 10 generally designates a boat hull, the construction of which includes an aft passenger or cargo cockpit 11 having a port side 12 and a starboard side 13. The forward end of the cockpit 11 leads into a cabin 14 mounted on a main deck (not specifically). A forward deck extends from the forward end of the hull 10 along both sides of the cockpit 11. The starboard and port sides of the hull progress forward from the aft end of the cockpit 11 to a bulkhead 17 which projects outwardly at a right angle. The sides 12 and 13 then continue forward toward the bow 18 where they converge to join at a keel 19 and a stem or prow 20. Hull configuration of low hydrodynamic and aerodynamic drag is thus defined.

It is to be noted that the after portion of the hull has a narrow beam as compared with the central and bow portions. The external area along the port and starboard sides of the hull to the rear of the bulkhead 17 provide recesses 21 which receive and accommodate retractable power plants and hydroskis hereinafter described. A recess 23 is provided on each of the undersides of the hull to receive the main portions of the hydroskis 24.

Each hydroski 24 (shown extended in FIGURE 1) has an under planing surface 25 adapted to engage the water as a component part of the hull when the craft is operatiing in a displacement or low speed mode and which, together with its counterpart ski, is the only portion of the boat which engages the water when the craft is in its high speed operational mode. The contour of the planing surface is designed to be congruous with the hull when the skis are retracted. Hence, in general, the aft portion of the planing surface is relatively flat while the forward end is substantially curved to conform and mate with the bow portion of the hull. Mounted on the aft portion of each ski is a power plant or engine housing 26 and a propelling unit housing 27

Although a conventional propeller may be used with the retractable skis it is preferable that the vehicle propulsion means which is mounted on the hydroskis incorporate a water jet propulsion system. Such a system or power package overcomes the requirement for transmitting power through long shafts and several right angle gear boxes which would be utilized were a conventional marine propeller to be employed. The present system basically consists of an engine which drives a pump having an underwater inlet and an ejection nozzle, the latter being located either above or below the water line of the craft according to design requirements. By proper design of water pump casing and ducts, the pressure and velocity of the fluid can be controlled, minimizing both low cavitation and surface eroding cavitation. The water-jet propulsion system is combined with simple vectoring mechanisms which provide vectored and reversible thrust so that dynamic steering is achieved at all speeds including reverse. Such a total combination provides features of control which are not attainable through the employment of conventional propellers and rudders. The specific features of the propulsion unit for this craft consists of commercially available engines, water intakes, pumps and vectored waterjets, the details of which do not form part of this invention and which are not shown nor fully discussed. The engine may be of the reciprocating type or a turbine power plant since each type has been found to have properties which would be advantageous under certain operating conditions.

The vehicle power plant housing 26 houses the engine (not shown) and serves to shield the engine from the water or water spray. It includes an air intake and exhaust enclosure 28 which is provided with a forward facing air intake duct 29 and an aft facing exhaust duct 30. The propelling unit housing 27 encloses a conventional water jet pump (not shown) which is operatively coupled to the engine. The complete propulsion system also includes a rearward directed water jet ejector nozzle 31 which is surrounded by the propulsion unit housing 27 and through which water from the pump is exhausted at a high velocity to provide forward thrust for the craft. A water intake duct (such as shown at 52 in FIGURE 2) is located on the bottom of each ski near the extreme aft end thereof through which water is supplied to the pump as the craft moves.

The hydroskis are retractably mounted on either side of the hull by pairs of struts 32 and 32a. The hydroskis are pivotally attached to one end of the struts. The opposite ends of the struts are pivotally attached to the structure of the hull. The forward pair of struts 32 are of shorter length than the after pair 32a so as to maintain the hull in a substantially horizontal position when the vehicle is cruising at high speeds, thereby reducing air resistance and improving riding comfort and visibility. The skis, when being extended, rock down and rearward via the struts, substantially as illustrated in FIGURE 1, so that the center of gravity of the hull moves forward with respect to the skis. The skis are actuated via the struts by any suitable means such as a hydraulic cylinder assembly (not shown).

Referring now to FIGURES 2 and 3, another embodiment of the present invention is shown wherein the marine vehicle selected for illustration is a hydroski assault craft. Conventional assault or amphibious marine vehicles are usually cumbersome and slow and the penetration of a plunging surf is extremely difficult and hazardous due to the poor sea-keeping qualities of relatively flat bottomed marine vehicles. Conventional high speed planing craft are capable of top performance only in relatively smooth water. Hydrofoils are compromised by their structural complexity and the necessity for retracting the foils during beaching or shallow water operation. Additionally, in order to maintain a desirable degree of control in following seas during high surf landings considerable power and speed is required. In their absence conventional landing craft often broach and swamp. Furthermore, the riding quality of conventional assault craft, from the passenger comfort standpoint becomes increasingly more rough as speed and wave height increase. This often causes personnel fatigue and seasickness.

The amphibious craft illustrated in FIGURES 2 and 3 includes a basic hull, indicated generally by arrow 33. It has a planing surface 34 and includes a central passenger or cargo well area 35 having port and starboard sides 36 and 37, respectively, connected at the aft end of the craft to a transom 38 which bounds the rear end of the area and terminates at the forward portion or bow of the craft at a ramp 39. The entire passenger or cargo well 35 is uncovered and the bow ramp 39, in accordance with conventional practice, is sometimes pivotally attached to the hull so that the ramp may be lowered or raised for convenience in loading and unloading. Similar to the FIGURE 1 configuration, the starboard and port sides of the hull progress forward from the transom 38 to a bulkhead 40 which projects outwardly at a right angle at the midsection of the craft and then continues forward toward the bow where the sides terminate with the opposite edges of the bow ramp or prow 39.

Also, similar to the embodiment shown in FIGURE 1, the aft portion of the craft hull has a narrow beam, the external area along the port and starboard sides defining the aft portion of the passenger cargo area. To the rear of the bulkhead 40 open recesses 42 are provided to accommodate retractable hydroskis 45 and the vehicle propulsion means 47. Open recesses 44 in the bottom of the hull receive the balance of the hydroskis.

Again, the hydroskis are shown in their extended positions as deployed during the high speed operation. When the hydroskis are retracted into the hull recesses 44, the skis are in a planing position in combination with the otherwise conventional profile of the craft.

Each hydroski 45 comprises an elongated portion having an under planing surface 46 for water engagement. The configuration of the planing surface is designed to generally conform to the shape of the hull. In the present instance the aft portion of the planing surface is relatively flat to match the bottom of the hull while the forward extremity of each ski is curved to conform to the downwardly convergent sides of the bow.

The vehicle propulsion means 47 which is mounted on the after extremity of each hydroski is substantially the same as that described with respect to FIGURE 1. It includes an engine 50 which drives a pump 51. The pump 51 draws water through an inlet 52 and ejects it through a nozzle 53. A housing 48 serves to shield the engine and other working assemblies from the water or water spray. The housing 48 includes an air intake and exhaust enclosure 54 which is provided with a forward facing air intake duct 55 and a rearward facing exhaust duct 56. The ski-mounting concept enables the conventional water jet pump 51 to be operatively connected to the engine via an uncommonly short and straight drive shaft 58.

The location of the power packages outside the hull increases the utility of the amphibious craft by facilitating the use of ramp openings at both ends or at the sides of the passenger or cargo well areas. The water jet propulsion system is a distinct advantage when shore contact is made during beaching operations since there is no possibility of a propeller running aground.

Combined with the water jet propulsions system is a flexible cable-controlled mechanism 59 which is mounted on the ejector nozzle 53 and operates to swivel the nozzle and controllably direct the exhausted water, thereby providing vectored or reversible thrust for steering. It also assures a high degree of maneuverability of all vehicle speeds and under a variety of environmental operating conditions.

The hull 33, struts 60 and the hydroskis 45 form linkages which are substantially in the form of modified parallelograms. The skis, when being extended rock down and rearward on the struts.

The skis are hydraulically controlled by a piston and cylinder assembly 61 which has one of its ends pivotally mounted to the hull 33 and its opposite end pivotally attached to a knee joint 62. The knee joint is rotatably interconnected to adjacent ends of a pair of links 63 and 64. The opposite end of the link 63 is pivoted to the hull structure while the opposite end of the link 64 is pivotally connected to the mid-section of a truss 65. The opposite ends of the truss are pivotally connected to the structure of the hull and the hydroski, respectively. When the piston is extended, the knee joint 62 is urged rearward until the links 63 and 64 are substantially linearly coextensive. As the links approach this position the truss rotates about its pivotal connection to the hull structure and the hydroskis are pivoted to the extended position illustrated.

Figure 4:
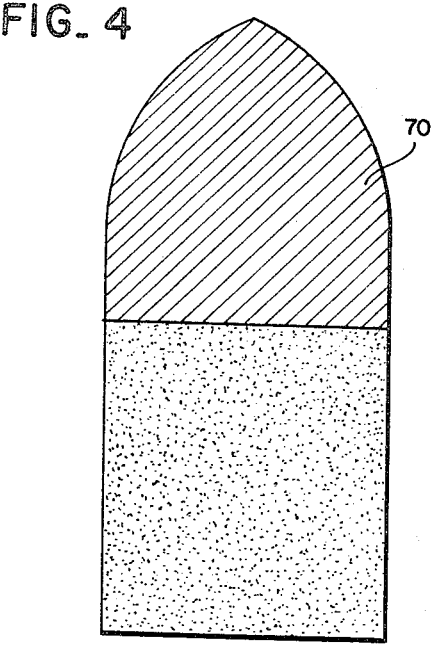
FIGURE 4 is a diagrammatic view of the bottom of a conventional planing hull illustrating the wetted area thereof.
Figure 5:
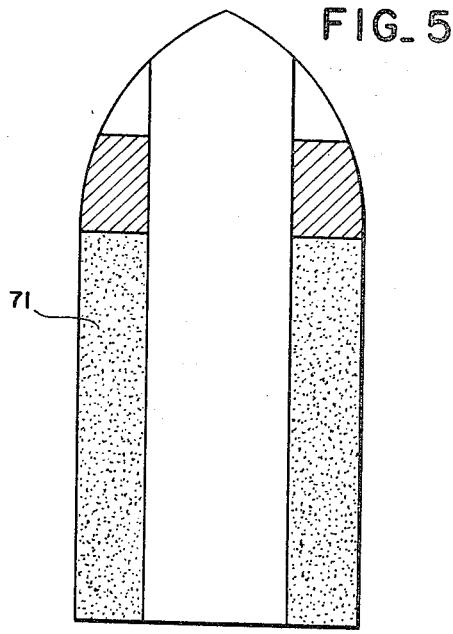
FIGURE 5 is a diagrammatic view of the bottom of the novel vehicle shown in FIGURES 2 and 3 illustrating the wetted area thereof.

As compared to a conventional planing craft a substantial reduction in load alleviation is achieved by the hydroski marine vehicle of the present invention. The diagrams illustrated in FIGURES 4 and 5, respectively, represent the bottom view of a conventional planing hull 70 and a hydroski craft 71. During operation in calm water and at normal speeds, only the aft portion of the respective vehicle hulls (as indicated by the hatched portion of the drawing) would be wetted. In the examples shown, wave action causes additional hull bottom area to be wetted. Such areas are indicated in the drawings by stippling. The comparative results in planing drag are readily apparent. For example, a load alleviation of 71% results from use of the hydroski hull, as compared to a conventional planing hull, when applying the formula lift equals $\frac{1}{2} p V^2 C_L S$ to vehicles having the following specifications:

> Overall length—25 feet
> Weight—4,500 pounds
> Speed—35 knots
> Test wave height—.8 ft.

The wetted area in calm water for the conventional planing hull produces a lift coefficient equal to .0185 at a trim angle of 1.840° while the wetted area in calm water for the hydroski craft has a lift coefficient of .0321 and a trim angle equal to 6.42°. The increase in wetted area when a wave .8 feet in height is encountered produces an additional wetted area in the planing hull equal to 74.7 feet squared, as compared with 12.5 feet squared for the hydroski craft. Applying the above formula, the added lift due to impact on an .8 foot wave is equal to 4806 pounds for the conventional planing hull while such lift is equal to 1396 pounds for the hydroski craft.

Rough riding characteristics in a water vehicle are the result of vertical displacement of the vehicle due to variations in increments of lift. The lift fluctuations are caused by variations in the water surface which are also directly related to changes in the amount of wetted bottom area, as indicated by the noted formula. A large change in area (S) produces a significant change in lift which is felt as an impact at high speed.

In conclusion, it can be seen that the hydroski vehicle of the present invention provides a reduction in wetted area over a conventional planing hull and that, therefore, as compared to conventional water vehicles, a lesser increment of lift will be developed in vehicles patterned after the described hydroski craft. It can also be seen that the hydroski craft of the present invention provides a composite planing surface incorporating two basic wetted areas for maximum efficiency. When the hydroskis are retracted, the hull operates in much the same way as does a conventional planing hull and is exposed to a wetted area in the same amount as is a conventional planing hull. However, when the hydroskis are extended the wetted area is greatly reduced and a meaningful load alleviation experienced. Consequently, a marine vehicle employing the present invention may carry more cargo than can be carried by otherwise equivalent vehicles; and with the distinct added advantage of a smoother riding and more maneuverable craft.

In actual operation, the marine vehicle of the present invention will be described with reference to the amphibious craft illustrated in FIGURES 2 and 3. In a displacement or low speed mode of operation, the hydroskis are retracted into the lower recesses 44 so that the vehicle propulsion systems are positioned within the open recesses 42. When so positioned the hydroski planing surfaces conform to and form a part of the planing surface in cooperation with the hull so that the wetted area of the hull takes substantially the form of that shown in FIGURE 4. In this mode of operation, maximum benefit is achieved through the employment of a water jet propulsion system since absence of a propeller and a rudder provides inherent shallow draft. This also provides the hydroski craft with inherent advantages for navigation through jungle rivers or other waters where flotsam is likely to be encountered.

The dual engines reduce the possibility of total power failure and also provide the added control feature of differential power adjustment through the vectoring mechanism 59.

During the transition mode of operation from low speed to high speed, the planing hull provides static displacement and the additional planing surface required to progress through the transition mode. This feature eliminates the necessity for any additional structures such as foils or blades generally required for the transition mode.

For high speed operation the hydroskis are used in the extended position. While planing at high speeds, the heavily loaded, narrow beam skis provide the required amount of planing area to support the craft but with a greatly reduced flat plate area exposed to wave impact. Hence, as indicated above, incorporation of the retractable skis on an otherwise conventional planing hull results in a composite structure which includes two different planing areas, each optimized for a specific speed-range.

The concept of this invention may also be envisioned as a "reefed beam hull." It should be noted that this concept provides a great reduction in slamming forces, thus permitting a retention of high speed in a seaway.

While particular embodiments of the present invention have been shown and described, it will be obvious to those skilled in the art that changes and modifications may be made without departing from this invention in its broader aspects, and, therefore, the aim in the appended claims is to cover all such changes and modifications as fall within the true spirit and scope of this invention.

What is claimed is:

1. A high speed marine vehicle comprising:
An elongated hull having a planing surface;
strut means pivotally secured to said hull and extendable downwardly therefrom;
a pair of hydroskis disposed in opposite sides of said elongated hull and pivotally secured to said strut means;
   each hydroski having a planing surface generally conforming to the shape of said hull to cooperatively provide primary lift during operation with skis retracted;
   a propulsion system mounted on the after extremity of each of said hydroskis; and
actuator means pivotally connected to said hull and to said strut means for moving said strut means to lower and raise said hydroskis whereby said vehicle is operable as either a conventionally planing or a hydroski vehicle.

2. The invention as defined in claim 1 whereby said hull planing surface cooperates with said hydroski planing surfaces to provide a hull lifting force during transition between hydroski extension and retraction.

3. A high speed marine vehicle comprising:
an elongated hull having a planing surface;
strut means pivotally secured to said hull and extendable downwardly therefrom;
a pair of hydroskis arranged on opposite sides of said elongated hull and pivotally secured to said strut means;
   each hydroski of said pair having a planing surface;
   a water jet propulsion system mounted on the aft extremity of each of said hydroskis;
said elongated hull having an aft reduced beam defining recesses for accommodating said propulsion system when said hydroskis are retracted; and
actuator means pivotally connected to said hull and to said strut means for moving said strut means to selectively lower and raise said hydroskis.

4. The invention as defined in claim 3 whereby extension of said hydroskis rocks the forward extremity of each hydroski downward and rearward from said hull so that said hull center of gravity moves forward with respect to said hydroskis.

5. A high speed marine vehicle comprising:
an elongated hull having side portions and a planing surface;
strut means pivotally secured to said hull and extendable downwardly therefrom;
a pair of parallel and transversely spaced elongated hydroskis located beneath said side portions of said hull and separated by said hull planing surface, each of said hydroskis pivotally secured to said strut means and having a planing surface for producing a hydrodynamic lifting force on said hull in cooperation with said hull planing surface;
water jet propulsion means mounted on the after extremity of each of said hydroskis;
actuator means for extending said hydroskis from said hull via said strut means so that said hull is supportable on the water by said planing surfaces of said hydroskis; and
said hull being adapted to receive said hydroskis, including said water jet propulsion means, when said hydroskis are retracted so that said hydroskis and said propulsion means conform with said hull and are generally congruous with the overall configuration of said hull.

6. A high speed marine vehicle comprising:
an elongated hull having a planing surface;
a pair of hydroskis disposed on opposite sides of said hull and separated by said hull planing surface;
spaced strut means pivotally carried by said hull and said hydroskis and adapted to selectively retain said hydroskis between an extended position in which said hydroskis extend downwardly from said hull and a retracted position in which said hydroskis are arranged within the profile of said hull;
water jet propulsion means mounted on the aft extremity of each said hydroski;
means in the opposite sides of said hull defining open recesses to receive said power propulsion means; and
means in said hull defining recesses to receive said hydroskis when said hydroskis are moved to their retracted position.

7. The high speed marine vehicle of claim 6 wherein said strut means comprises a forward pair and an after pair of struts pivotally carried by said hull and pivotally secured to said hydroskis so as to form a parallelogram linkage arrangement whereby said hydroskis are selectively movable between an extended position wherein the center of gravity of said hull is moved forward with respect to said hydroskis and a retracted position in which said hydroskis are nested within the profile of said hull.

8. The high speed marine vehicle of claim 6 wherein said strut means includes a forward and a rearward pair of struts, said forward pair being of shorter length than said rearward pair so that said struts, said hydroskis and said hull form a parallelogram linkage arrangement and that the center of gravity of said hull moves forward with respect to said hydroskis when said hydroskis are extended in said advanced position.

9. A high speed marine vehicle comprising:
an elongated hull;
a pair of extendable hydroskis disposed on opposite sides of said elongated hull;
water jet propulsion means carried on the aft extremity of each of said hydroskis;
forward and aft supporting strut means pivotally connecting said hydroskis to said hull and movable with respect to said hull so that the center of gravity of said hull moves forward with respect to said hydroskis when said hydroskis are extended; and
actuating means carried by said hull and operatively coupled to said aft supporting strut means for extending and retracting said hydroskis away from and into said elongated hull.

10. The high speed marine vehicle of claim 9 wherein means is provided defining outwardly open recesses in the opposite sides of said hull to receive said propulsion means and means defining downwardly open recesses in said hull separated by said hull planing surface are provided to receive said hydroskis when said hydroskis are moved to their retracted positions.

11. The invention as defined in claim 10 wherein each hydroski of said pair includes an under planing surface configured to conform with said hull planing surface when said hydroskis are moved to their retracted position.

12. The invention as defined in claim 11 wherein said hull planing surface cooperates with said hydroski planing surfaces to provide a hull lifting force during transition between hydroski extension and retraction with respect to said hull.

13. The invention as defined in claim 9 wherein said water jet propulsion means includes a pump mounted on each hydroski;
   an engine mounted on each hydroski; and
   a straight drive shaft operably coupling said engine to said pump.

14. A marine vehicle comprising:
an elongated hull having an under planing surface;
a pair of hydroskis movably mounted on opposite sides of said hull and being separated by said hull planing surface;
a forward pair and an after pair of struts pivotally connected between said hull and said pair of hydroskis;
actuating means carried by said hull and operatively coupled to said after pair of struts for extending and retracting said hydroskis;
a water jet propulsion system carried on the aft section of each of said hydroskis and including a water pump and an engine, a straight drive shaft coupling said engine to said water pump;
a propulsion compartment mounted on each of said hydroskis for enclosing and sealing said engine from water and water spray;
means defining outwardly open recesses in the opposite sides of said hull adapted to receive each of said propulsion compartments; and
means defining downwardly open recesses in said hull separated by said hull planing surface for receiving said hydroskis when said hydroskis are retracted so that said compartments and hydroskis are arranged within the profile of said hull.

References Cited by the Examiner
UNITED STATES PATENTS

| | | | |
|---|---|---|---|
| 763,684 | 6/1904 | Manker | 114—66.5 |
| 2,344,619 | 3/1944 | Lake | 114—66.5 |
| 2,370,318 | 2/1945 | Lake | 114—66.5 |

MILTON BUCHLER, *Primary Examiner.*

ANDREW H. FARRELL, *Examiner.*